United States Patent [19]

Frank

[11] 4,189,711
[45] Feb. 19, 1980

[54] MULTILEVEL PROCESSING OF IMAGE SIGNALS

[75] Inventor: Amalie J. Frank, Chatham Township, Morris County, N.J.

[73] Assignee: Bell Telephone Laboratories, Incorporated, Murray Hill, N.J.

[21] Appl. No.: 849,599

[22] Filed: Nov. 8, 1977

[51] Int. Cl.$^2$ ............................................. G06K 9/12
[52] U.S. Cl. ................. 340/146.3 H; 340/146.3 AC; 358/260
[58] Field of Search .............. 340/146.3 H, 146.3 AC; 358/260, 261, 135; 235/92 PC

[56] References Cited

U.S. PATENT DOCUMENTS

| | | | |
|---|---|---|---|
| 3,408,485 | 10/1968 | Scott et al. | 235/92 PC |
| 3,461,231 | 8/1969 | Quinlan | 358/135 |
| 3,643,019 | 2/1972 | Beltz | 358/261 |
| 3,801,737 | 4/1974 | Komura et al. | 358/260 |
| 3,956,580 | 5/1976 | Murayama | 358/260 |

OTHER PUBLICATIONS

Huang, "Run–Length Coding and Its Extensions", *Picture Bandwidth Compression*, 1972, pp. 231–264.
Graham, "Image Transmission by Two–Dimensional Contour Coding", *Proc. of IEEE*, vol. 55, No. 3, Mar. 1967, pp. 336–345.
Frank, "Partitioning and Coding a Two–Dimensional Field", *Proc. of 3rd Int. Conf. on Pattern Rec.*, Nov. 1976, pp. 816–821.
Grimsdale et al., "System for Automatic Recognition of Patterns", *Proc. of IEE*, vol. 106, Pt. B, No. 26, Mar. 1959, pp. 210–221.
Elias, "Predictive Coding", *IRE Transactions–Information Theory*, Mar. 1955, pp. 16–33.
Hoffman, "A Method for the Construction of Minimum Redundancy Codes", *Proceedings IRE*, Sep. 1952, pp. 1098–1101.
Mit Press, "Transmission of Information", 1961, pp. 75–81.
Tyler, "Two Hardcopy Terminals for PCM Communication . . . . .", *Conf. Record 1969 Int. Conf. on Communications*, Jun. 1969, pp. 11-21–11-28.

*Primary Examiner*—Leo H. Boudreau
*Attorney, Agent, or Firm*—Robert O. Nimtz; Alfred E. Hirsch

[57] ABSTRACT

A graphic arts image comprising a plurality of regions, each region having a characteristic multilevel intensity, hue, texture or the like, is sampled and coded using samples along two consecutive scan lines. Individual code words are generated for the beginning, or head, of each run defining the start of a vein or boundary of a region of contiguous like-valued samples along each line and other code words are used for connecting information relating to samples on adjacent lines defining continuations of the boundary for the same region. Other code words identify the characteristic intensity or the like of the region, and a final type of code word identifies the end of the vein. Because the present method and apparatus advantageously codes each internal boundary between adjacent regions only once, an increase of efficiency by a factor approaching two is realized over techniques previously used.

8 Claims, 16 Drawing Figures

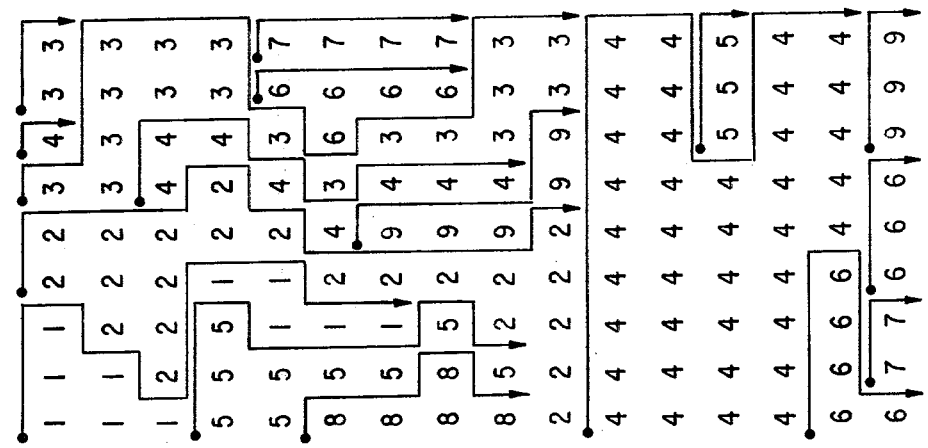

MULTILEVEL PROCESSING OF IMAGE SIGNALS

BACKGROUND OF THE INVENTION

1. Field of the Invention

The present invention relates to apparatus and methods for the coding and storing of graphical information. More particularly, the present invention relates to apparatus and methods for generating and storing coded representations of high fidelity multilevel graphic art images suitable for the photocomposition of printed materials. Because of the ease of generating efficient codes using the present invention, applications including real time facsimile and teleconferencing transmission, long term storage of x-ray or like data, and machine cutting operations are possible.

2. Description of the Prior Art

Recent years have witnessed greatly increased usage of automatic means for composing and printing page copy for use in directories, catalogs, magazines and other printed works. An important aspect of such photocomposition schemes is the coding and storage of machine-compatible signals representative of graphical source information. In particular, when pictorial information and/or high-resolution type fonts are to be used, it has been found necessary to identify by scanning with great particularity the individual graphical entities associated with the source material. To permit the further processing of these data it has usually been necessary to store them in memories having substantial capacity. Often these data are stored for long times, as when they are to be used in successive issues of a book, magazine or the like. Because typical published materials, especially photographic or other picture materials are so diverse, and because the information content of such materials is so great, the volume of data required to be stored is potentially very large. It is especially important therefore that these data be stored in as efficient a manner as possible.

A number of particular coding and storage schemes have been developed for efficiently storing and transmitting information. For example, the variable length codes described in Elias, "Predictive Coding", *IRE Transactions Information Theory*, March 1955, have proved to be useful in many variations. The well-known Huffman codes described, for example, in Huffman, "A Method for the Construction of Minimum Redundancy Codes," *Proceedings I.R.E.*, September 1952, pp. 1098-1101, and Fano, *Transmission of Information*, The MIT Press, 1961, pp. 75-81, offer optimum efficiency under particular circumstances. The application of these techniques to graphical information has generally been limited to one-dimensional coding, i.e., coding of signals associated with a single scan line in the source copy.

U.S. Pat. No. 3,461,231 issued Aug. 12, 1969 to R. V. Quinlan describes a system for performing limited two-dimensional encoding. However, his techniques are limited to transmitting only an indication of the differences between data corresponding to two successive scan lines. A related technique is presented in Tyler, "Two Hardcopy Terminals for PCM Communications of Meterological Products," *Conference Record, 1969 International Conference on Communications*, June 9-11, 1969, pp. 11-21 through 11-28. Tyler encodes his data (meteorological information) in terms of differential lengths for run lengths on two successive scan lines. Huang, "Run-Length Coding and its Extensions," in Huang and Tretiak (Eds.), *Picture Bandwidth Compression*, Gordan and Breach, New York 1972, pp. 231-264, discusses some extensions to the work of Tyler.

Other two-dimensional coding of picture information is described in D. N. Grahan, "Image Transmission by Two-Dimensional Contour Coding," *Proceedings of the IEEE*, Vol. 55, No. 3, March 1967, pp. 336-345.

The above-cited Quinlan and Tyler references indicate a need to determine not only what is encoded, i.e., which parameters are encoded, but also how, exactly, these parameters are to be encoded. The latter aspect of the problem is also treated in U.S. Pat. No. 3,643,019, issued Feb. 15, 1972 to J. P. Beltz. Particular reference is made by Beltz of the applicability of his techniques in commercial photocomposition systems such as the RCA VIDEOCOMP Series 70/800. Although Beltz applies a variable-length coding to segments defining a "zone", each such zone is the area defined by a single scan line, i.e., he does not attempt to extend his results to two-dimensional coding. Likewise, though Graham and Huang speak of Huffman codes, their application is to very specific geometric entities.

The present invention, while related, in part, to earlier work described in my copending U.S. patent applications, Ser. Nos. 425,506 and 675,926 filed Dec. 17, 1973 and Apr. 12, 1976, provides for the first time a method and apparatus for coding multi-level images. My application Ser. No. 425,506 discloses an approach to the efficient coding of the "blobs" of one of two levels. This approach extends with important differences to the efficient coding of regions of images having more than two gray levels or colors or textures. It also realizes many of the processing simplifications described in my application Ser. No. 675,926.

SUMMARY OF THE INVENTION

In accordance with one embodiment of the present invention, a visible image, e.g., a photograph, typed copy, line drawing or any combination of these or like images, is scanned, sampled and converted into multilevel quantized signals. The image or field typically comprises a plurality of regions or blobs, where the level (hue, brightness, texture, or the like) is constant or of a defined content within any given region; different regions, however, will, in general have one of a plurality of levels. In coding region boundaries and contents (and subsequently decoding them) apparatus and methods in accordance with a typical embodiment of the present invention operate on a field sequentially from top to bottom only once, accessing at most samples from two lines at a time. An encoder capitalizes on correlation in two dimensions, and codes a large portion of the boundary segments only once. The resulting simplicity of logic, fast operation, small buffer requirement, and coding efficiency are particularly well-suited for implementation via special purpose hardware, or a combination of microprocessor and special purpose hardware.

BRIEF DESCRIPTION OF THE DRAWINGS

FIG. 2A shows numerical pattern corresponding to values for samples of a typical image, including boundaries defining the respective regions;

FIG. 2B shows a pattern of coded words used to encode the samples of FIG. 2A in accordance with one embodiment of the present invention;

DETAILED DESCRIPTION

1. Background and Definitions

Figure 1A:
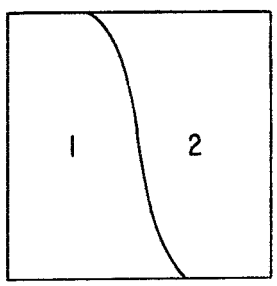
FIGS. 1A through 1J indicate various possible occurrences of veins demarking adjacent regions in an image.

Before proceeding with the detailed description, it proves convenient to define certain terms and describe some conventions used with some regularity in the sequel.

It is well known that much information-bearing copy has only two levels of image intensity, e.g., black and white. In other cases one or more intermediate brightness levels, i.e., gray levels, are used. In still other cases, multiple colors and brightness levels are used. For present purposes, image copy will be assumed to possess any discrete number of levels. A special case will be that where only two brightness levels (conveniently black and white) occur. When actual image intensity does not equal one of the allowed discrete values, a standard quantizing operation will be used to "round-off" signals representing such image regions.

Although high quality reproduction of images often requires substantial continuity of all connected parts of an image, i.e., no gaps in the reproduced image, it proves convenient in intermediate processing to use digital techniques, i.e., to treat such images as collections of discrete elements. Thus in processing a typical image there is conceptually superimposed on the image a grid of horizontal and vertical lines defining individual picture elements (pels). In practice these pels are arbitrarily, but sequentially, assigned to particular image subject matter by causing the image to be scanned by an optical or other scanning means, thereby to generate a signal indicative of the brightness level (or color, texture, or the like) occurring along a narrow scan line. A typical optical image scanning system is disclosed in U.S. Pat. No. 3,445,588 issued to J. F. Nicholson on May 20, 1969. Functionally equivalent scanning apparatus is disclosed in the above-cited Beltz patent in connection with the RCA VIDEOCOMP Series 70/800 photocomposition system. Many particular scanning devices may be used to generate signals representative of the image intensity along a scan line.

The actual definition of individual pels is accomplished in standard practice by sampling the output of the scanner. Thus, in general, the output of a scanner is a continuous signal not unlike that associated with standard television broadcast signals. These signals are then sampled in response to periodic clock signals generated by a source of standard design. Typical apparatus for performing such scanning and sampling operations is disclosed in my copending patent application cited above.

As commonly used in television and other picture processing arts, a "run" is an occurrence of like-brightness level or like-color pels in consecutive pel positions along a scan line. Thus if along a typical scan line a black run begins at the fourth pel and continues through the fifteenth pel, a run of 12 black pels results. The concept of a run is generalized for preventive purposes to cover a sequence of samples along a scan line having the same characteristic, whether it be brightness, color, texture or any other definable characteristic. While horizontal scanning is assumed in the present disclosure, it is clear that similar runs can be defined for vertical scan lines. In further connection with the actual scanning, it will be assumed that each scan line proceeds from a left end to a right end. Particular pels along each scan line are identified by an abscissa coordinate integer beginning at the left with 1 and ending with N for an N-pel scan line.

2. Code Structure Overview

Unlike my earlier coding techniques and apparatus described in the above-cited copending patent application the invention described presently deals with the coding of boundaries for distinct regions in an image. These regions are alike in some fundamental way, each as having the same brightness level, color, texture, or other widely diverse state of being such as freedom from tree disease in the case of a forest image.

Above unifying theme is that of a vein, like that occurring in a natural leaf. As is well known, such veins typically have beginning points, end points, branch points and the like. The present section of the disclosure will formalize such geometrical characteristics and in drawing so will disclose some important structural aspects of the present coding techniques and apparatus.

FIGS. 1 A–J shows a number of possible views or windows of portions of a typical graphic arts images for illustrating the various occurrences in a leaf image. In each case one or more veins traverse the window forming distinct regions. It is assumed that the new process operates on a horizontally scanned, digitized form of each window, and that the width of the window is known to the coding process. In overview, four types of codes are used, referred to here as I, H, C, and E codes. The various I codes identify the contents of a region, such as various gray levels or texture patterns. The various H codes give the length of the top most run of elements, called the "head", of a region. The various C codes indicate how a vein at one image line connects to a vein in the previous line. In digital form, this coding procedure encodes the displacement in number of elements of a boundary from one image line to the next. The single E code indicates the bottom or end of a region. This code structure is now explained in detail, tracing the various configurations that may occur by means of the images in FIGS. 1 A–J. A composite example of the code structure is then given, and the partitioning and encoding and decoding processes and apparatus are discussed.

Veins Starting at the Top

Consider first the case as shown in FIG. 1A, where only one vien traverses the window, forming a boundary between two regions, 1 and 2. Starting with the first image line, code first an H code for the length of the head of region 1, followed by an I code identifying the region contents as "1". Next, there is an H code for the length of the head of region 2, and an I code to identify the region contents as "2". For each succeeding image line the runs in the line are compared with those in the previous line only. In the example in FIG. 1A each image line starts with a run of 1's, but the runs end at varying places, as indicated by the vein separating region 1 from region 2. Accordingly, for each image line a C code is output to indicate how the vein there connects to the same vein in the previous line, and a C code is output for the vein coincident with the right side of the image. One can think of each vein as defining the right edge of a region, or equivalently as defining the length of the successive runs comprising the region.

Note that since the image width is known, it logically requires no explicit coding of region 2's right edge, which is coincident with the right side of the image. This means that one does not strictly require an H code for a head ending at the right side of the image, or a C code for a run that is not a head but ends at the right side of the image. However, these codes are indeed included for two reasons.

Firstly, in order to exclude such codes we would have to introduce considerable logic complexity in apparatus for both the encoding and decoding processes. This increased implementation complexity is not generally warranted by the associated small increase in coding efficiency. At best the savings in bits per pel is $KA/A^2$ or $K/A$, where K is the average bits for the H or C code for the run at the end of the line, and A is the number of lines.

Secondly, a reason for the inclusion of the H code explicitly has to do with the sequence of codewords and the total codebook structure. Namely, if an I code always follows an H code, and if an I code never follows any code other than an H, then the codes may be separated into two sets, one containing the I codes, and the other containing all other codes. Two codewords, one from each set, need not be distinct. In other words, separate codebooks may be used for the two sets. This results in higher coding efficiency than if all the codewords had to be distinct. Alternatively, if greater efficiency results, the order of the H and I codes can be reversed, and thus the H codes rather than the I codes isolated into one codebook. In any case, for a head extending to the right side of an image, a special H code, $H_0$, is established signifying no particular head length, but rather whatever length is required to extend the head to the end of the image line.

Figure 1B:
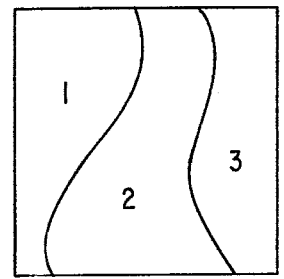

Multiple veins as shown in FIGS. 1B merely cause the addition for each such vein of an H code and an I code, and a set of C codes delineating the course of the vein progressing downwards. These various codes advantageously appear in the output code stream in the order in which their respective conditions arise in the left-to-right, line-by-line comparison process. Thus, for FIG. 1B, we output an H code and an I code for region 1, an H code and an I code for region 2, and $H_0$ code and an I code for region 3, and then for each successive image line three C codes for the right edges of regions 1, 2, and 3 respectively.

Bifurcating Veins

Figure 1C:
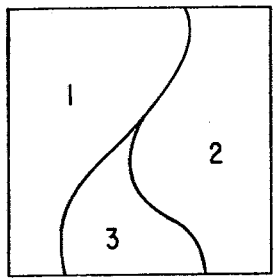

A vein that bifurcates forms a new region, such as region 3 in FIG. 1C. In this case, the left leg of the bifurcation is taken as a continuation of the parent vein, and the right leg is treated as a new vein. Thus, for the first image line in which region 3 occurs, output first a C code to indicate a connection to the parent vein in the previous image line. It can be seen that this vein continues to demarcate the right edge of region 1. Following this an H code and an I code for region 3 are output. This establishes the new vein defining the right edge of region 3. This is followed by a C code for the right edge of region 2. For each successive line three C codes are output for the right edge of regions 1, 3, and 2 respectively.

Veins Starting at the Side

Figure 1D:
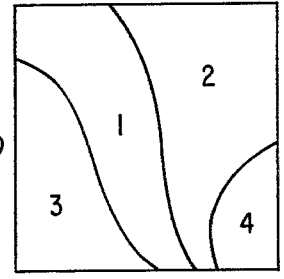

A new vein may also start at the left or right side of the image, as shown in FIG. 1D. Consider first region 3 cutting in from the left. For the image line immediately previous to the one containing the head of region 3, two C codes are output for the right edges of regions 1 and 2 respectively. Output next are an H code and an I code for region 3, and two C codes for the right edges of regions 1 and 2, respectively. For each image line thereafter until region 4 is reached, three C codes are output for the right edges of regions 3, 1, and 2 respectively. The vein marking the left of region 4 is taken as a continuation of the right edge of region 2, i.e., as a continuation of the vein coincident with the right side of the image line containing region 4. First, three C codes for the right edges of regions 3, 1, and 2, respectively are output. Output next are the $H_0$ and I codes for region 4. For each remaining image line we output four C codes for the right edges of regions 3, 1, 2, and 4 respectively.

Veins Starting in the Interior

Figure 1E:
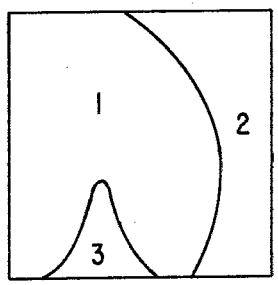
Figure 1F:
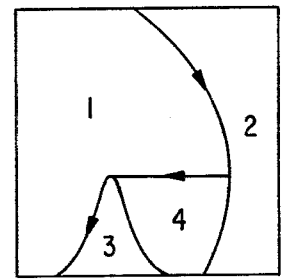

A pair of veins may also start in the interior of an image, forming a new region, such as region 3 in FIG. 1E. At the point that region 3 starts, region 1 divides into two legs, one to the left and one to the right of region 3. Accordingly, from this point onwards three veins are needed for regions 1 and 3, one each for the right sides of the two legs of region 1 and one for the right side of region 3. This need is handled by forming a new region, 4, for the right leg of region 1, as shown in FIG. 1F. For the first image line in which region 3 occurs a connection is coded for the vein which progresses from the right side of the upper part of region 1, along the top of region 4, and along the right side of the left leg of region 1. This vein is marked by arrows in FIG. 1F. Output next are the H and I codes for region 3, and then the H and I codes for the region 4, and finally the C code for the right edge of region 2. The I codes for regions 1 and 4 are, of course, identical. For each subsequent image line, four C codes are output for the right edges of regions 1, 3, 4 and 2 respectively.

Veins Merging in the Interior

Figure 1G:
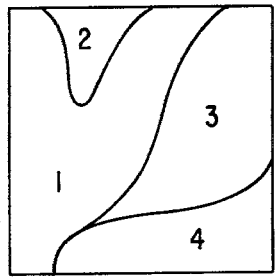
Figure 1H:
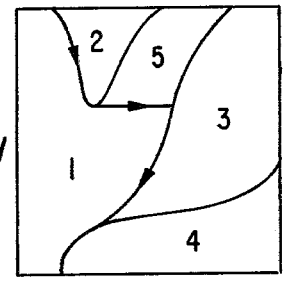

An analogous situation to that just described occurs where a pair of veins coalesce in the interior of an image, thus ending a region such as region 2 in FIG. 1G. In this case region 1 initially has two legs, which join at the point that region 2 ends. Up to this juncture three veins are needed for regions 1 and 2, one each for the right sides of the two legs of region 1, and one for the right edge of region 2. As in the previous case a separate region, 5, is formed for the right leg as shown in FIG. 1H. For the first image line H and I codes are output for each of the regions 1, 2, 5, and 3, respectively. As before, the I codes for component regions, 1 and 5, are identical. For subsequent image lines up to and including the last line containing region 5 we output C codes for the right edges of regions 1, 2, 5, and 3, respectively. For the image line following the last one in which region 5 occurs, output first is a C code for the vein which progresses from the right edge of the upper left leg of region 1, then along the bottom of regions 2 and 5, and along the right edge of the lower part of region 1. This vein is marked with arrows in FIG. 1H. Output next are two E end codes for regions 2 and 5, and finally a C code for the right edge of region 3.

For each image line thereafter until region 4 is reached, two C codes are output for the right edges of regions 1 and 3, respectively. For the image line containing the first run of region 4, C codes are output for the right edges of regions 1, and 3 and the $H_0$ and I codes for region 4. For each succeeding line up to and including the one containing the last run of region 3, three C codes are output for the right edges of regions 1, 3, and 4, respectively. At this point a case may be seen in which two veins meet and continue along as single path. For the image line following the last line in which region 3 occurs, a C code is output for the right edge of region 1, an E code for region 3, and a C code for the right edge of region 4. For each remaining line two C codes are output for the right edges of regions 1 and 4, respectively.

Veins Ending at the Side

Figure 1I:
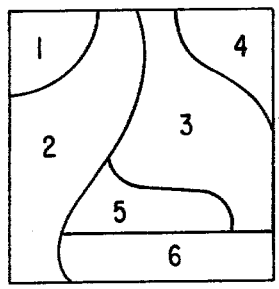

Veins merging into the side of an image mark the end of a region, as shown in FIG. 1I. Consider first region 1 ending on the left side. For the last image line in which region 1 occurs, C codes are output for the right edges of regions 1, 2, 3 and 4, respectively. For the next image line, output an E code for region 1, followed by the C codes for the right edges of regions 2, 3, and 4 respectively. For each succeeding image line up to and including the last line in which region 4 occurs, output C codes for the right edges of regions 2, 3 and 4 respectively. Similarly, for the next line, output C codes for the right edges of regions 2 and 3 respectively. As region 3 in this image line extends to the right side of the line, it simultaneously means that region 4 ends. Hence in this case no E code is needed for region 4. The same condition applies if the run extending to the right side of the image is the head of a new region. Also, more than one region may be ended in this manner. Thus, proceeding downward in FIG. 1I past the start of region 5 and continuing past the image line containing the last runs of regions 5 and 3, it may be seen that these regions are automatically ended without E codes merely by the specification of the head of region 6.

Veins and Runs Spanning Full Lines

Figure 1J:
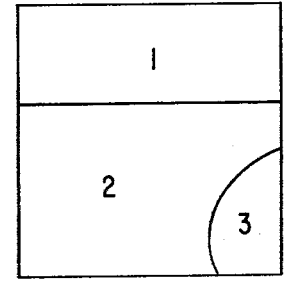

FIG. 1J shows a final configuration where the vein and some of the runs span a full image line. For the first image line the $H_0$ and I codes are output for region 1. For each subsequent line in region 1 a C code is output for the region's right edge, which is coincident with the right side of the image. For the first line of region 2, $H_0$ and I codes are output for region 2. As indicated before, no E code is required for region 1 in this case. For each succeeding line in region 2 up to the line just before the start of region 3 a C code is output for the right edge of region 2. The vein marking the left of region 3 is taken as a continuation of the right edge of region 2, which is coincident with the right side of the image. This is similar to the configuration shown in FIG. 1D. Accordingly, for the next image line, outputs are a C code for the right edge of region 2 and the $H_0$ and I codes for region 3. For each remaining line the output is two C codes for the right edges of regions 1 and 3, respectively.

A Composite Example

FIGS. 2A and 2B give a composite example of the partitioning and coding of a two-dimensional field. FIG. 2A shows the two-dimensional field and the explicitly coded veins, and FIG. 2B shows the associated codes. The codes appear in a two-dimensional layout for easy reference to the original field. In practice they may form a linear serial stream.

For each H code in FIG. 2B the associated vein in FIG. 2A is shown as a line along the top and right side of the associated run. For each C code the vein is shown continued down the right side of the run. The start of a vein is marked by a ball, and the end by an arrowhead. To show clearly the path of individual veins, those vein segments which are coincident in FIG. 2A are shown slightly offset from each other. These segments, which require double encoding, occur in a horizontal direction only.

The subscripts on the codes in FIG. 2B identify the region associated with the code. For example, $H_5$ is the H code demarking the beginning of region 5, the region having intensity or color 5. A C code traces the vein along the right boundary of a region and bears the subscript of that region. In this example, the simplest condition is used for connection of veins at the right edge of runs in two successive lines. That is, the two runs under comparison have the same region identification codes. With this condition, an image J pels wide may have 2 J-1 possible C codes. In this case the two runs may be geometrically separated from each other, such as the two runs of region 1 in the third and fourth image lines. If desired, regions like this may be avoided, or the partitioning otherwise altered by placing additional restrictions on the runs under comparison. For example, one may require that the right ends of the runs be within K elements of each other, or that the runs overlap by at least L elements, or that the number of elements in the second run be no more than M times larger and no less than N times smaller than the number of elements in the first run. Restrictions such as these generally increase the number of regions defined. They may also decrease the number of different values for the C codewords.

Inspecting FIG. 2A, note that the encoding itself need not explicitly mark the veins along the bottom of particular regions, such as regions 5 and 8, and those at the bottom of the image. If desired, as for example in a machine cutting operation, these lines can be easily added in the decoding process. Thus, upon reaching the end of a vein, signaled by an E code, the vein can be extended to the left until the abutting region or the left side of the image is reached. In all cases, of course, the line defining the left side of the image must be added. Of possible importance also to a cutting operation, note that the resulting veins do not crisscross. This is always true and results from progressing only from left to right in comparing the runs on two successive image lines. This is discussed in further detail below.

3. Partitioning and Encoding Process (Overview)

The coding structure for the various geometric configurations of a digitized two-dimensional field has been described. Described now is a concomitant process which partitions and encodes a field in accordance with this code structure.

For the first image line, one need simply output the appropriate H and I codes for each distinct run of like elements in the line. One then places this line in a buffer A and reads the next line into a buffer B. For each buffer a pointer is maintained, which at any given time in the process addresses one of the runs in the associated buffer. At the start of the comparison between the contents of the two buffers, the pointers are set at the left end of their respective buffers. One then compares the two runs thus addressed, and outputs none or some codewords depending upon the comparison. Following this one or both pointers are progressed to the next run in the line. The comparison is now made on the two runs currently addressed, and codewords outputted as called for, and one or both pointers progressed to the next run in the line. Pointer movement is always from left to right. These actions continue until both pointers reach the right end of their respective buffers. When this occurs, buffer B is changed into buffer A, the next image line is read into buffer B, and the comparison process repeated. This cycle continues until all image lines are processed.

The comparisons made between two runs addressed by the buffer pointers are as follows. If the runs have matching region identifications, then output the appropriate C code and progress the pointer for each buffer to the next run to the right in the buffer, or to the end of the buffer if the run just processed is the last one in the buffer. Assuming a run is left in each buffer, restart the comparison process. For runs with matching region identifications, one may also place further restrictions on the connectivity as dictated by a particular application, as discussed previously.

Continuing with the comparison process, if the two runs addressed by the buffer pointers do not have matching region identifications, then search to the right of the buffer A run to determine if buffer A contains a run within a "specified" distance and which has the same region identification as the buffer B run. This search does not move the buffer A pointer, but is executed with an auxiliary mechanism. The "specified" distance referred to is in general some function of the positions of the buffer A and buffer B runs addressed, again as dictated by a particular application. For example, the search may include only one run to the right of the buffer A run, and/or the search may include all buffer A runs whose left ends are to the left of or at the right end of the buffer B run. The search ends, of course, if the end of buffer A is reached. In any case, if this search produces a buffer A run with the same region identification as the buffer B run and which satisfies any other desired connectivity conditions, one then outputs an E code for each run in buffer A starting with the buffer A run addressed by the buffer A pointer up to and including the run immediately to the left of the matching run produced by the search. Then progress the buffer A pointer to the matching run, and output a C code. Each buffer pointer is then progressed to the next run in the buffer, or to the end of the buffer if the run just processed is the last one in the buffer. If a run is left in each buffer, restart the comparison process.

On the other hand, if the search indicated above does not yield a connecting run, then the run addressed in buffer B is the head of a new region. Accordingly, one outputs the appropriate H and I codes, using the $H_O$ and I codes if the run ends at the right end of the line. After outputting these codes, progress only the buffer B pointer to the next run to the right in the buffer, or to the end of the buffer as applicable. If a run is left in each buffer, restart the comparison process.

If the runs in buffer B exhaust before or at the same time as the runs in buffer A, bypass any remaining runs in buffer A, change buffer B to buffer A, read the next line into buffer B, reset the buffer pointers to the left end of the buffers, and start the run comparisons anew. If the runs in buffer A exhaust before the runs in buffer B, then all the remaining runs in buffer B are heads of regions. Here, the appropriate H and I codes for each remaining run are outputted, using the $H_O$ and I codes for the last run. Buffer B is then changed into buffer A, the next image line read into buffer B, the pointers reset, and the run comparisons continued.

4. Decoding Process (Overview)

A process for decoding a bit stream generated by the previous encoding process is now described. Buffers A and B, and associated pointers, are used as before. Initially, a parsing process is used which accesses the code bit stream for the next codeword and identifies it as a particular H, C, E, or I code. To insure efficient parsing and codeword identification, the technique for decoding variable length codes described in my U.S. Pat. No. 3,883,847, granted May 13, 1975, may be used. The initial codewords in a bit stream specify the head lengths and region identification for the runs in the first line, which are entered into buffer B. Each time the buffer is filled, "end of line" processing takes place, i.e., the buffer contents are used, buffer B is changed into buffer A, and the pointers are reset. Using buffer B may mean, for example, displaying it on a screen, generating hard copy, or storing it for subsequent processing. After thus handling the first line, codewords are retrieved from the bit stream, runs entered into buffer B, and the buffer pointers progressed as dictated by the codewords and the contents of buffer A. Again, upon filling buffer B, "end of line" processing is executed, and the process of filling buffer B is restarted. This cycle continues until the bit stream is exhausted.

The action invoked by the various codes may be summarized as follows. For an H code, the next codeword from the bit stream is retrieved. This is always an I code. Next entered into buffer B is a run of length and type indicated by the H and I codes, starting at the position addressed by the buffer B pointer. If this run ends before the end of the line, the buffer B pointer is progressed one position to the right of the newly entered run, and the next codeword is retrieved. If the run ends at the end of the line, "end of the line" processing is executed.

For a C code, the buffer A pointer is progressed to the right end of the run currently being addressed, and the C code is applied to this position to fix the right end of the run which is to be entered into buffer B. Using the same region identification as the run addressed in buffer A, the run is then entered into buffer B, starting at the position addressed by the buffer B pointer. If this run ends before the end of the line, the buffer B pointer is progressed to one position to the right of this run. In this case, if the buffer A pointer is not at the end of the line, it is also progressed one position to the right of its current position. If the run just entered ends at the end of the line, "end of line" processing is executed.

For an E code, the buffer A pointer is merely progressed to one position beyond the end of the current run addressed by the pointer, and the next codeword is retrieved.

Implementation

Figure 3:
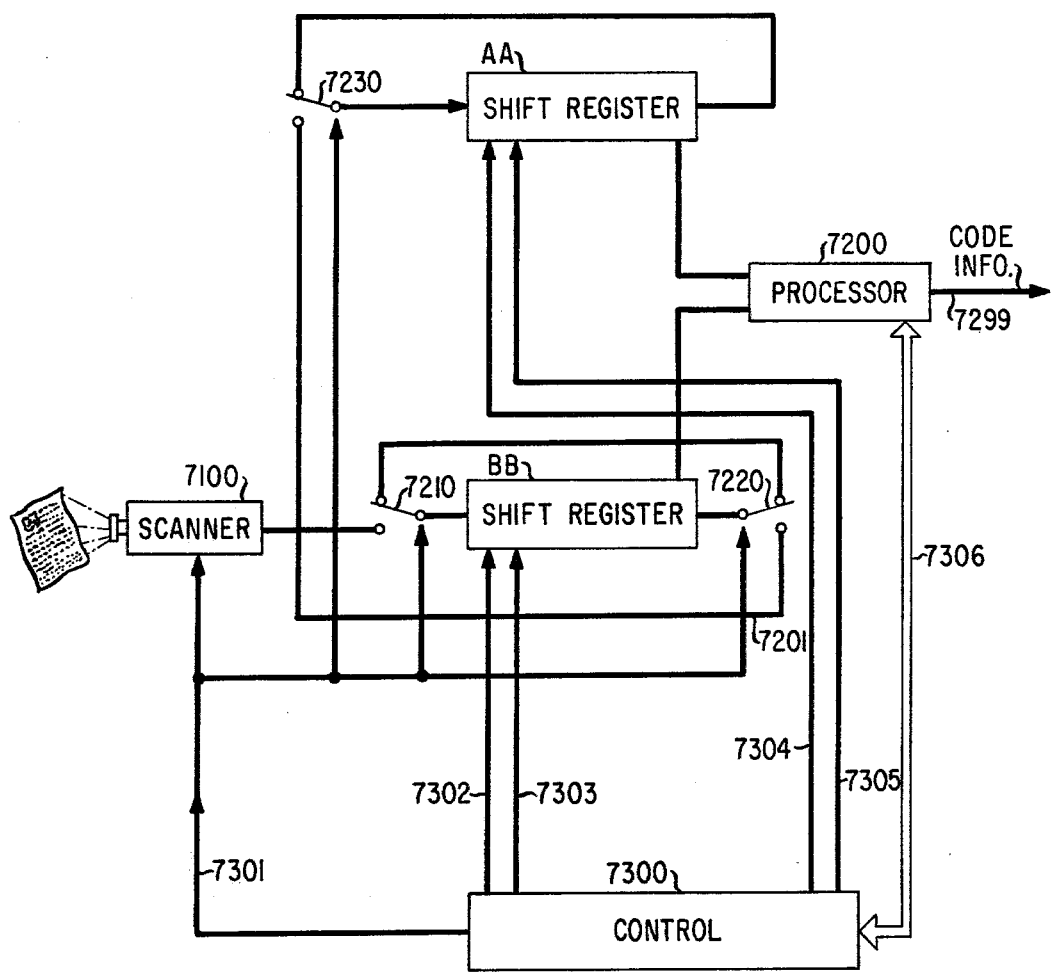
FIG. 3 is a block diagram of processor apparatus for realizing one embodiment of the present invention.

Turning now to the actual processing methods and apparatus of this invention, it will be seen that FIG. 3 depicts a general block diagram of an embodiment of apparatus for encoding picture information in accordance with the present invention. FIG. 4 is a diagram, showing the operational flow within the apparatus disclosed by FIG. 3, i.e., the various states that the apparatus assumes and the operations performed within each state. FIG. 4 may also be viewed as a flow chart from which a computer program may be constructed and implemented on a general purpose computer to substitute for much of the hardware of FIG. 3.

At the logical beginning, or "front end", of the encoder on FIG. 3 is scanner 7100 which operates on an image to be encoded and scans the image sequentially, line by line. Scanner 7100 may be an optical scanner or a nonoptical scanner. A typical optical scanner is disclosed in U.S. Pat. No. 3,445,588 issued to J. F. Nicholson on May 20, 1969. Functionally equivalent scanning apparatus is disclosed in the above cited Beltz patent in connection with the RCA VIDEOCOMP, series 70/800, photocomposition system. Many other devices may be used to generate signals representative of diverse states of an image along a scan line.

Thus, as other scanners, scanner 7100 provides a sequence of tone indications for individual picture elements. The actual definition of individual picture elements (pels) is accomplished, as in standard practice, by sampling the output of the scanner. Thus, the scanner internally develops a continuous signal not unlike that associated with standard television broadcast signals. The associated circuits within the scanner sample the signal with a periodic clock signal, and quantize the sampled signal to represent image pels. It will be assumed that the scanner produced sequential level signals having one of $n=2^k$ values. In a typical case $n=16$ so $k=4$ binary signals are used for each sample. Again, "level" can be interpreted to be color, texture, or the like.

Operation of the encoder of FIG. 3 alternates between two phases, input and processing, under control of control element 7300. In the input phase, the contents of a shift-right/shift-left register BB are transferred to shift-right/shift-left register AA through switch 7220, line 7201, and switch 7230, and scanner 7100 applies its output signal to register BB through a switch 7210. The scanner and switches 7210, 7220, and 7230 are controlled by line 7301. In the processing stage, switches 7210, 7220, and 7230 are switched so that register AA cycles upon itself, in either direction, through switch 7230, and register BB cycles upon itself, in either direction, through switches 7210 and 7220.

Processing of the scanned signals to develop the desired output codes is achieved by connecting output signals from register AA and an output signal from register BB to a processor 7200, and by controlling registers AA and BB and processor 7200 with a control element 7300. Specifically, register BB is controlled with shift-right/shift-left clock signals 7302 and 7303 and register AA is controlled with shift-right/shift-left clock signals 7304 and 7305, and processor 7200 interacts with control element 7300 via a two-way bus line 7306.

Processor 7200, which is the main processing unit of the encoder, processes the information of each current scan (located in register BB) by comparing it to the information of the preceding scan (located in register AA).

Figure 4A:
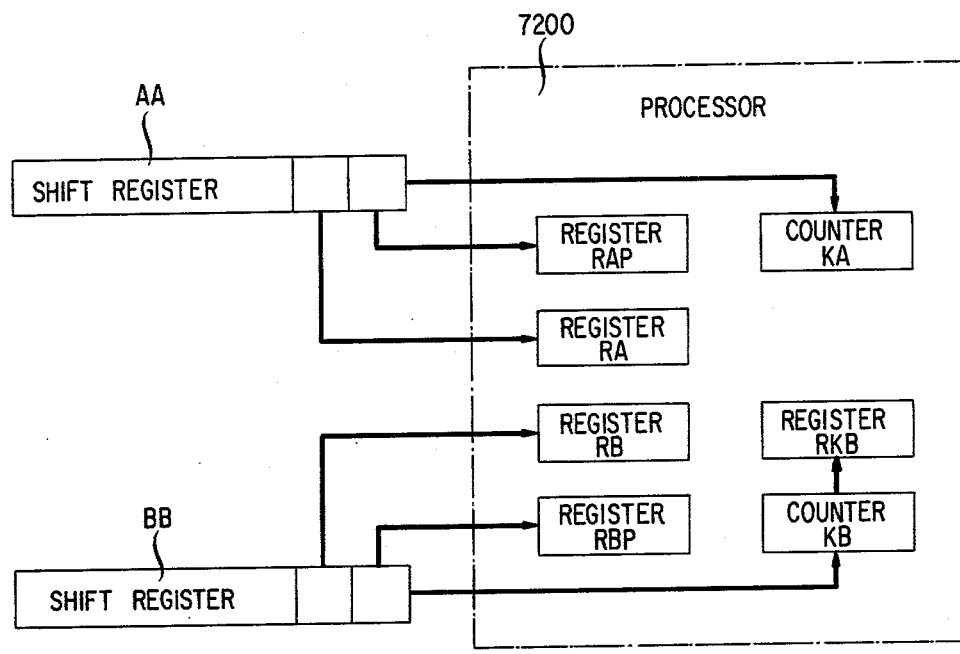
FIGS. 4A and 4B are a flow chart illustrating the operation of the circuit of FIG. 3.

FIG. 4A diagrams the main elements of processor 7200. Register RAP contains the rightmost signals of shaft register AA. These K signals specify the level of the rightmost pel indicated in AA. Thus in the typical case cited previously, it contains four binary signals to indicate one of sixteen levels. Register RA contains the next rightmost K signals, specifying the next pel in AA.

Similarly, registers RBP and RB contain the binary signals for the rightmost and next to rightmost pels in shift register BB, respectively. Counter KA keeps track of the register AA pel being processed and provides an indication whenever the line in register AA has been processed completely. Counter KB serves the same purpose for the pels in register BB. Register RKB is used to store the position of the start of a run of like numbered pels less 1, and is used in conjunction with counter KB to give the length in number of pels of a head run.

Figure 4B:
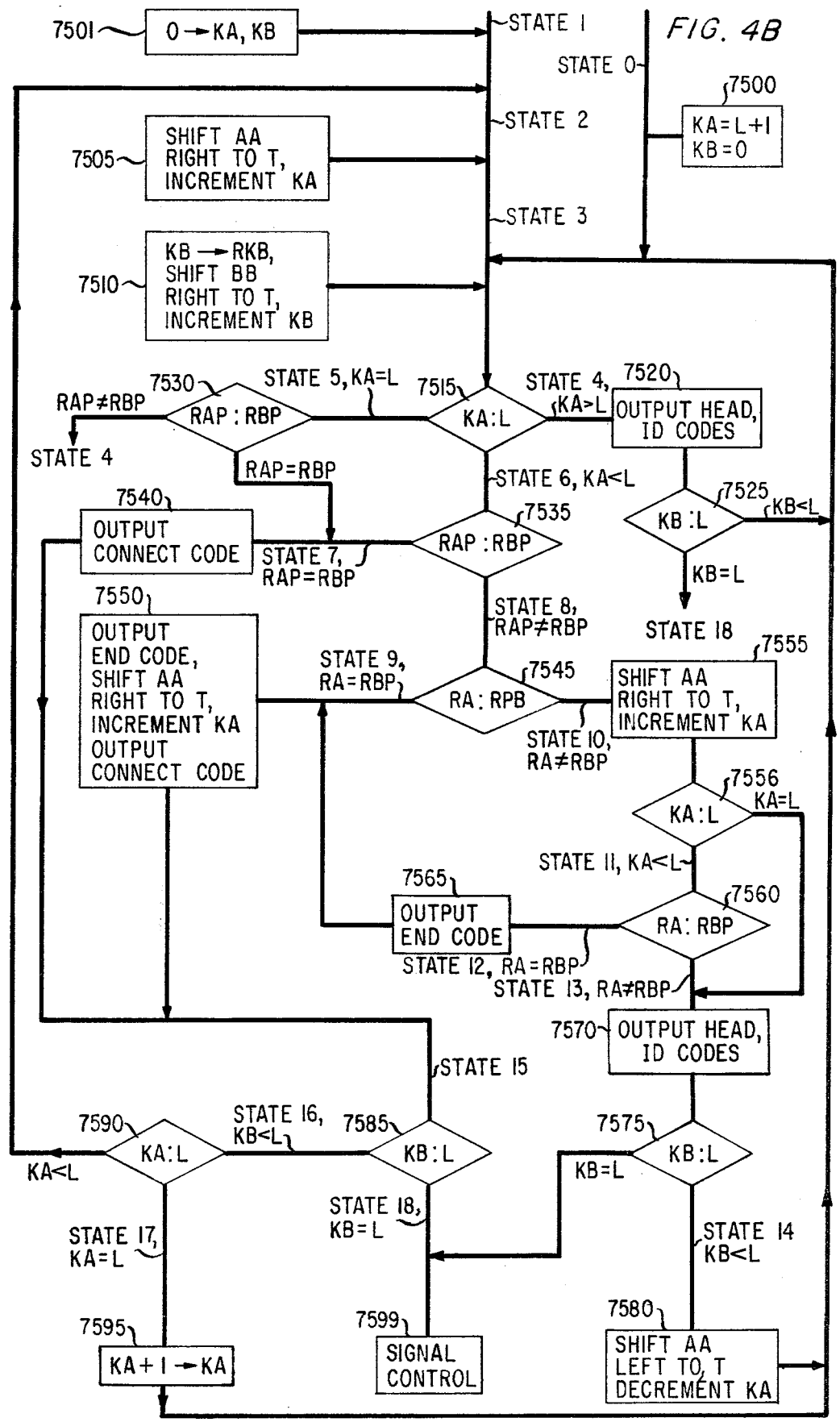

When data are shifted into register BB for the first image line, the processor of FIG. 3 is placed in STATE 0, corresponding to block 7500 in FIG. 4B. In this case, all of the runs in the image line are to be coded as head runs. At block 7500 the counter KA is set to L+1. This will force subsequent tests at block 7515 to route to block 7520. Block 7500 also indicates that counter KB is to be set to the initial value of 0. Then STATE 0 terminates and entry is made to STATE 3, corresponding to block 7510.

Subsequently, when data are shifted into registers AA and BB from register BB and scanner 7100, respectively, the processor of FIG. 3 is placed in STATE 1. This state corresponds to block 7501 in FIG. 4B, where counters KA and KB are initialized to 0. Then STATE 1 terminates and STATE 2 corresponding to block 7505 is entered. Block 7505 indicates that register AA is to be shifted right until a transition T from one level to the next occurs. This is accomplished by repetitively shifting register AA right K bits at a time and comparing the contents of registers RAP and RA. When such contents are unequal, the shifting is stopped. Block 7505 also indicates that for each right shift of K bits the counter KA is to be incremented by 1. It is to be noted that during the processing states register AA cycles upon itself. Bits shifted out of the right end of the register enter the left end of the register through switch 7230. Register AA has capicity for L+2 pels, where L is the length of an image line in pels. To provide for proper detection of the final run in a line when shifting right, an extra set of K bits is inserted into register AA following the end pel of a line. These K bits are made to have a different configuration from the K bits of the last pel in the line. Similarly to provide for proper detection of the first run in a line when shifting left, another set of K bits is inserted into register AA prior to the beginning pel of a line. This set of K bits is made to have a different configuration from the K bits of the first pel in the line. The insertion of the extra bits is done prior to entering the processing states. The data in register BB are constructed in a similar manner.

Upon completing the shifting and comparing operations of block 7505, register RAP generally contains the last pel of the run in register AA currently being processed, and register RA contains the first pel of the next run, and counter KA contains the position number of the pel in register RAP. When the functions in block 7505 have been executed, STATE 2 terminates and STATE 3 corresponding to blocks 7510 and 7515 is entered.

Block 7510 first indicates that counter KB is to be saved in register RKB. Then register BB is shifted right until a transition T from one level to the next occurs. This is accomplished as with register AA, by repetitively shifting register BB right K bits at a time and comparing the contents of registers RBP and RB. When such contents are unequal, the shifting is stopped. Block 7510 also indicates that for each right shift of K bits the counter KB is to be incremented by 1. Upon completion of shifting, register RBP generally contains the last pel of the run in register BB currently being processed, and register RB contains the first pel of the next run, and counter KB contains the position number of the pel in register RBP. In the event that the register BB run currently being processed is a head run, then the difference KB-RKB is the length of the head run. At block 7515 the contents of counter KA, the position of the register AA run currently being processed are compared to L, the number of pels in the image line. If KA exceeds L it means that all runs in register AA have already been processed, and that each remaining unprocessed run in register BB are to be treated as head runs. In this case STATE 3 is terminated, and STATE 4 is entered. If KA equals L, then the register BB run currently being processed is the last run in the image line. Here STATE 3 is again terminated, but STATE 5 is entered. If KA is less than L, then STATE 3 is also terminated and STATE 6 is entered.

STATE 4 corresponds to blocks 7520 and 7525. Block 7520 inicates that the processor develops and generates a head code and an ID code. The head code depends upon the length in number of pels of the register BB run currently being processed. The processor evaluates KB-RKB to be the length of the head run, and uses this, or a function of this, as an address to access a ROM or other table memory device, which contains the specific codewords for the various head lengths. These codewords may be any conveniently chosen set of code values. In particular it is efficient to assign variable-length Huffman minimum-redundancy codes. These codes, as well as means for addressing a table memory containing these or other codewords are discussed in my U.S. patent, "Uniform Decoding of Minimum-Redundancy Codes," U.S. Pat. No. 3,883,847, issued May 13, 1975. In one possible form the ROM contains a separate codeword for each distinct head length. In many situations this results in an undesirably large codebook. My copending U.S. patent application, Ser. No. 425,506, describes how smaller codebooks may be achieved by using a single prefix code for a range of head length values. A particular head length is then coded with a prefix code, and with an appended fixed length code which specifies a particular member within the range of values implied by the prefix code. The appended code is a simple arithmetic function of the head length and does not appear in the ROM unit. The ROM contains distinct and separate entries for only a small set of head lengths, and one or more prefix codes, each of which applies to a range of head lengths.

Block 7520 also indicates that the processor develops and generates an ID code. This corresponds to the level of the register BB run currently being processed, and is contained in register RBP. Here also the processor uses the contents of register RBP as an address to access a ROM or other table memory device, which contains the specific codewords for the various levels. As before it is efficient to assign Huffman codes for this purpose. As mentioned previously, we may form two separate codebooks, one for the ID codes, and the other for the head, connect, and end codes. Also, if higher efficiency results, we may reverse the order of the H and I codes, and isolate the head instead of the ID codes in a separate codebook. In any case, all codewords may occupy the same ROM.

At block 7525, the contents of counter KB, the position of the register BB run just processed, are compared to L, the number of pels in the image line. If KB is less than L, then there are some register BB runs which have not yet been processed. In this case STATE 4 is terminated and STATE 3 corresponding to block 7510 is entered to shift the register BB to the next run. If KB is equal to L, then the register BB run just processed is the final register BB run. In this case, all of the register AA runs have also been processed, and so STATE 4 is terminated, and entry is made to STATE 18 corresponding to block 7599, where the Control 7300 of FIG. 3 is signaled to alternate switches 7210, 7220, and 7230, and to transfer the contents of register BB to register AA and fill register BB with a new line of image data.

STATE 5 corresponds to block 7530, where the contents of registers RAP and RBP are compared. These registers contain the levels of the runs currently being processed in registers AA and BB respectively. If these levels are equal, then it is concluded in this implementation that the corresponding runs belong to the same region. In this case, exit is made from STATE 5, and entry is made to STATE 7 at block 7540 where a connect code is output. As mentioned previously, particular applications may require that additional conditions be met before runs are concluded to connect. Thus, for example, it may be required that the runs overlap by at least one pel. Concomitant processing is required to handle any such additional conditions. In the case that the levels of the two runs are not equal at block 7530, then the register BB run does not connect to the register AA run. As this register AA run is the final run, there are no other possible register AA runs for the register BB run to connect to, and it is concluded that the register BB run is a head run. In this case STATE 5 is terminated and STATE 4 corresponding to block 7520 is entered.

STATE 6 corresponds to block 7535, where the contents of registers RAP and RBP are compared. As before, these registers contain the levels of the runs currently being processed in registers AA and BB respectively. If these levels are equal, then it is concluded in this implementation that the corresponding runs belong to the same region. In this case STATE 6 is terminated and entry is made to STATE 7 corresponding to block 7540, where a connect code is output. As indicated above, additional connectivity conditions may be specified. In the case that the levels of the two runs are not equal at block 7535, then STATE 6 is terminated and STATE 8 at block 7545 is entered to perform a limited search in register AA for a run connecting to the register BB run.

STATE 7 corresponds to block 7540, which indicates that the processor develops and generates a connect code. This code depends upon the relative positions of the ends of the runs currently being processed in registers AA and BB. In this particular implementation where no restriction is placed on the distance between the ends of the runs, there are $2L-1$ possibilities for the relative positions of the ends of the runs. Accordingly, in this case the processor evaluates $KB-KA+L$, and uses this as an address to access a ROM or other table memory. This device contains the $2L-1$ codewords corresponding to as many possibilities for the ends of the indicated runs. As before, it is efficient to assign Huffman codes for this purpose. After the connect code is outputted, STATE 7 terminates and entry is made to STATE 14 corresponding to block 7585, where it is determined if any additional processing of the runs in registers AA and BB is required.

STATE 8 corresponds to blocks 7545, where a search is started of subsequent runs in register AA to determine if any such run connects to the register BB run currently being processed. In this particular implementation we include no more than two additional register AA runs in this search operation. In the material below we refer to these two runs as the first and second subsequent register AA runs. Other implementations may call for searching with other conditions imposed, as discussed earlier. At block 7545, the contents of registers RA and RBP are compared. Register RBP contains the level of the register BB run currently being processed. Register RA contains the level of the first subsequent register AA run i.e., the next after the one tested at block 7535. If these levels are equal, then it is concluded in this implementation that the corresponding runs belong to the same region. In this case STATE 8 is terminated, and entry is made to STATE 9 corresponding to block 7550, where an end code is output for the bypassed register AA run, and a connect code is output for the two connecting runs.

STATE 9 corresponds to block 7550. Here the processor first develops and generates an end code. As there is only one end codeword, the processor simply accesses the appropriate location in the ROM for the code and outputs it. Then the register AA is shifted right until a transition T from one level to the next occurs, as at block 7505. Block 7550 also indicates that for each right shift of K bits the counter KA is to be incremented by 1. Then the processor developes and generates a connect code, as at block 7540. STATE 9 then terminates, and entry is made to STATE 15 corresponding to block 7585.

STATE 10 corresponds to blocks 7555, and 7556. Arrival at this state indicates that the first subsequent register AA run did not connect to the register BB run currently being processed. It is now desired to test the second subsequent register AA run, if any, for connection to the register BB run. To do this, block 7555 first indicates that register AA is to be shifted right until a transistion T from one level to the next occurs, as at block 7505. Block 7555 also indicates that for each right shift of K bits the counter KA is to be incremented by 1. In the event that the first subsequent register AA run was the final run in register AA, then there is no second subsequent register AA run and the register BB run does not connect to any register AA run. In this case counter KA at this point contains the value L, the number of pels in an image line. At block 7556, the contents of counter KA are compared to L. Accordingly, if KA equal L, then STATE 10 is terminated and entry is made to STATE 13 corresponding to block 7570 in order to output the head and ID codes for the register BB run. If, however, KA is less than L, then STATE 10 is terminated and entry is made to STATE 11, corresponding to block 7560 in order to determine if the second subsequent AA run connects to the register BB run.

STATE 11 corresponds to block 7560, where the contents of registers RA and RBP are compared. Register RBP contains the level of the register BB run currently being processed. Register RA contains the level of the second subsequent register AA run. If these levels are equal, then it is concluded in this implementation that the corresponding runs belong to the same region. In this case STATE 11 is terminated, and entry is made to STATE 12 corresponding to block 7565 to output the end codes for the two bypassed register AA runs, and to output the connect code for the connecting runs. However, if the levels are not equal then the register BB run is a head run, and STATE 11 is terminated, and entry is made to STATE 13 at block 7570 in order to output the required head and ID codes.

STATE 12 corresponds to block 7565. Here the processor develops and generates an end code as at block 7550. This end code is for one of the two bypassed register AA runs. Then STATE 12 is terminated, and entry is made to STATE 9 corresponding to block 7550 to output an end code for the second bypassed register AA run and to output the required connect code.

STATE 13 corresponds to blocks 7570 and 7575. At block 7570, the processor develops and generates a head code and an ID code for the register BB run, as at block 7520. At block 7570, the contents of counter KB, the position of the register BB run just processed, are compared to L, the numbers of pels in the image line. If KB is equal to L, then the register BB run just processed is the final register BB run. In this case STATE 13 is terminated, and entry is made to STATE 18 corresponding to block 7599, where Control 7300 is signalled to retrieve a new line of image data. If KB is less than L, then STATE 13 is terminated, and entry is made to STATE 14 corresponding to block 7580.

STATE 14 corresponds to block 7580, where register AA is shifted left until a transition T from one level to the next occurs. This is done to reverse the shifting done at block 7555, and to retrieve the register AA run which was shifted out but not processed at that time. In accordance with the left shift, counter KA is now decremented by 1. Exit is then made from STATE 14, and entry is made to STATE 3 corresponding to block 7510, in order to advance to the next register BB run.

STATE 15 corresponds to block 7585. Entry is made here after outputting a connect code. If the register BB runs just processed is the final register BB run, then processing of the runs in registers AA and BB is complete, and it is desired to call in the next line of data. At block 7585, the contents of counter KB, the position of the register BB run just processed, are compared to L, the number of pels in the image line. If KB equals L, then STATE 15 is terminated, and entry is made to STATE 18 to retrieve the next line of image data. If KB is less than L, then there is at least one register BB run which has not yet been processed. In this case STATE 15 is terminated, and entry is made to STATE 16 corresponding to block 7590.

STATE 16 corresponds to block 7590. Here we determine if there is at least one register AA run which has not yet been processed. This is done at block 7590, where the contents of counter KA, the position of the register AA run just processed, are compared to L, the number of pels in the image line. If KA is less than L, then there is at least one more register AA run to be processed. Then STATE 16 is terminated, and STATE 2 corresponding to block 7505 is initiated in order to advance to the next register AA run. However, if KA is equal to L, then all of the register AA runs have been processed. In this case, STATE 16 is terminated, and STATE 17 corresponding to block 7595 is activated.

STATE 17 corresponds to block 7595, which simply increases counter KA by 1, thereby causing it to be greater than L. This will force subsequent tests at block 7515 to route to block 7520. Exit is then made from STATE 17, and then STATE 3 corresponding to block 7510 is initiated. Subsequently, the processor cycles repetitively through blocks 7510, 7515, 7520, and 7525 in order to output a head and an ID code for each remaining unprocessed register BB run.

STATE 18 corresponds to block 7599, where the control 7300 of FIG. 3 is signalled to alternate switches 7210, 7220, and 7230, and to transfer the contents of register BB to register AA and fill register BB with a new line of image data.

Figure 5:
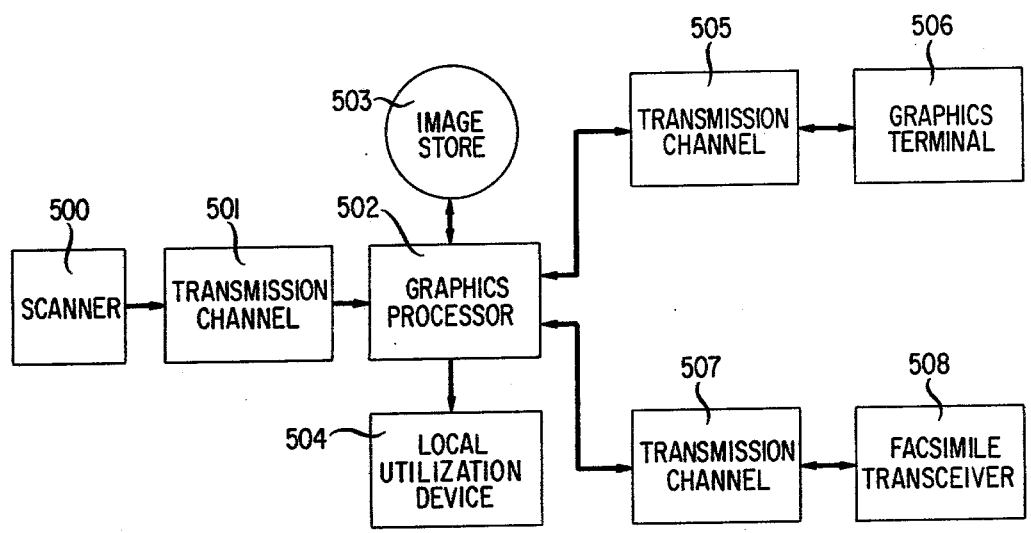
FIG. 5 is a block diagram of an alternative embodiment of the present invention.

FIG. 5 shows one typical overall processing and communications system including the coding function to be supplied in accordance with the present invention. As an illustration this system is related to two applications. One of these concerns the automated production of the printing of advertisements in the Yellow Pages of telephone directories. The other is a system for mass screening for breast cancer by ultrasound imaging and the associated facility for remote medical teleconsultation.

In the printing application, art copy as it typically appears in advertisements, is scanned by scanner 501. Equipment such as the Scanner/Digitizer System, Model No. DSD120/240 of the Destdata Corporation, Sunnyvale, California, may be employed for this purpose. The sampled, digitized image signals are either encoded or sent directly via transmission channel 501 to graphics processor 502. These signals may represent bilevel or multilevel gray tones, colors, or texture patterns. More generally, the signals may represent any set of region contents where a unique number is assigned to each member of the set, and where the contents are defined parametrically, algorithmically, or by simple dictionary look-up. The signals may be generated by other processors, such as pattern recognizers, as well as by conventional optical scanners. Graphics processor 502 stores these digitized images in image store 503.

Upon demand from an artist at a graphics terminal 506, processor 502 retrieves items from the image store, converts the code, if necessary, to the transmission channel and/or terminal format and transmits them via transmission channel 505 to graphics terminal 506. Here the advertisement layout proceeds interactively, and includes the addition of text, cropping, and size and position change of the images. A graphics terminal of this nature is described by P. B. Denes and I. K. Gerschkoff in "An Interactive System for Page Layout Design", *Proceedings of the ACM Annual Conference,* November 1974, pp. 212-221. Commercially available equipment is the AUTOLOGIC APS 22 terminal. Upon completion of an advertisement layout, specification for the contents of the advertisement are transmitted back to processor 502, which stores them in an auxiliary store along with references to the coded image data in image store 503. It is possible also that new images may be generated interactively at graphics terminal 506. These would also be transmitted to processor 502 and coded and stored in the image store.

Upon demand from a salesman at the facsimile transceiver 508, for example, the processor retrieves an advertisement from the image store, converts the code, if necessary, to the transmission channel and/or facsimile transceiver format, and transmits the advertisement via transmission channel 507 to facsimile transceiver 508. The transceiver may be located in a regional sales office, or it may be a portable unit and carried by the salesman to the customer's site. The dex 180 facsimile transceiver of Graphic Sciences, Inc., Danbury, Connecticut, and the digital facsimile transmitter Model DDX of the Stewart-Warner Corporation, Chicago, Illinois are among the equipments that may be used for these purposes. The facsimile copy is presented for customer approval. Changes may be marked on the facsimile copy, and transmitted back to graphics processor 502, for routing to a graphics terminal for immediate or subsequent action by the interactive artist.

When a directory is to be published, processor 502 retrieves the image data from image store 503, converts the code, if necessary, to that required by the printing composition equipment. It then marries the image data for each advertisement with the text and other data carried in an auxiliary store, and transmits the entirety of data to the local utilization device 504, in this case a printing composer. Such composition equipment may be, for example the Mergenthaler Linotron photocomposer with film output. Laser plate-making devices are also potential local utilization devices.

In the above system, the present invention finds important application to reduce storage requirements, to reduce transmission bandwidth, and to decrease transmission time. With respect to storage, the large volume of images appearing in the advertisements of a telephone Yellow Pages directory, as well as the high resolutions, on the order of 500 to 1000 lines per inch required for printing purposes, results in an extremely large data base. A system of this type is viable only if the data is coded efficiently to minimize storage requirements. It is well known, of course, that images innately require greater transmission bandwidth than voice or other types of data, and that data reduction for this purpose is desirable. However, in this application transmission time is of even higher priority in order to meet real-time, on-site customer demand, and also efficiently to utilize manpower at the graphics terminal. For these reasons the present invention may be incorporated both at the central graphics processor site, and also at any interface with a transmission channel, most importantly in this application at the facsimile transceiver and at the graphics terminal, and possibly also at the scanner.

Efficient storage and transmission of images are also of key importance in the second application of mass screening for breast cancer by ultrasound imaging. The coding efficiencies obtainable with the present invention are reported in "Coding Ultrasound Images," by A. J. Frank and J. M. Schilling, Proceedings IEEE 1977 Workshop on Picture Data Description and Management, April 1977, pp. 172-181. In this case, the proposed system operates as follows. Scanner 500 is an ultrasound transducer fitted into a local traveling field unit. The signals generated are sampled, digitized, coded according to the present invention, and transmitted to graphics processor 502, located at a central hospital. Processor 502 stores the images in image store 503. Upon demand, these coded images may be called out of the image store 503, decoded, and transmitted to local utilization device 504 for high quality hardcopy output on film or photographic paper. The Photomation P1700 of Optronics International, Inc., Chelmsford, Massachusetts, or similar equipment may serve as the output device. In addition, images in the image store may be retrieved, decoded, and submitted to an automatic pattern recognition system. Finally, the images may be transmitted as part of a teleconsultation operation via transmission channel 504 to graphics terminal 506, or via transmission channel 507 to facsimile transceiver 508. Such teleconsultation operations are expected to provide important specialist services to small hospitals or paramedics in outlying areas. In this case, graphics processor 502 would be located in the outlying area, and the graphics terminal and facsimile equipment in the larger central city medical facility. Experiments with teleconsultation operations are reported in "An Evaluation of the Teleconsultation System Elements," by S. Krainin, et. al., Massachusetts General Hospital, Report PB-242 584 prepared for the Veterans Administration, June 1975. With mass screening efforts, the potential size of the image store is enormous. Furthermore, it is expected that a mammogram requires long term storage of about five years. In addition, a woman suspected of having a cancer will be advised to have multiple subsequent scans, all of which are to be stored, and compared with each other by automatic or visual means. Accordingly, efficient coding is a necessity, particularly for storage purposes and for transmission from local field scanners 500 to graphics processor 502. While the expected volume of consultation traffic is unknown at present, it is probably that the viewers at the graphics terminal and facsimile receivers will be highly trained medical staff working under pressure, and thereby also requiring speedy transmission. As before, the present invention finds important application at the graphics processor site, and also at scanner 500 for encoding, and at the graphics terminal 506 and facsimile device 508 for decoding.

It is to be noted that the two-line at a time operation of the present invention is particularly well suited for the line-by-line mode of operation usually found in facsimile devices, graphics terminals, and scanners. The present invention is also compatible with digital networks concepts. Furthermore, the relative simplicity of logic of the present invention permits the implementation by use of hardwired logic components, LSI circuits, or microprocessors. The latter is particularly attractive for the central graphics processor, where versatility as well as speed is desirable. An application of a commercially available microprocessor for communications purposes is described in "Microprocessor Implementation of High-Speed Data Modems," by P. J. Van Gerwen, N. A. M. Verhoeckx, H. A. Van Essen, and F. A. M. Snijders, *IEEE Transactions on Communications,* Vol. COM-25, No. 2, February 1977, pp. 238-250.

In accordance with the aspects discussed above, Listings 1, 2, and 3, attached as appendices hereto, represent an implementation of the coding logic of the present invention in a program suitable for microprocessor operation. The coding in all listings is in the FORTAN programming language, as described, for example in the Honeywell Series 60 (Level 66)/6000 FORTRAN manual, Honeywell Information Systems, Inc., Waltham, Massachusetts, 1976. This particular language may be replaced by any other language depending upon availability, desired operating speed, economics, or other pertinent processing considerations.

Listing 1 contains the main multilevel processing program. The techniques used are those enumerated in FIG. 4B, where block numbers correspond to program statement numbers in Listing 1 with minor differences as indicated below. Shift registers AA and BB in FIG. 4B correspond to the arrays LINEA and LINEB in Listing 1. In addition to the processing of the image lines contained in LINEA and LINEB, this program also supplies the function of transferring LINEB to LINEA and reading in the next image line into LINEB. In the encoding process, this program assigns various codes to the image parameters. These codes vary in size but are assumed in this implementation individually not program calls the subroutine OUTPUT, comprising Listing 2. The arguments passed to the subroutine OUTPUT are the code itself at the right end of one computer word, and the length of the code in bits in another computer word. The subroutine OUTPUT then appends the indicated code bits to an internal buffer. When this buffer is full, OUTPUT writes the buffer contents into an auxiliary store, and continues to fill the buffer starting again at the beginning. At the end of processing an image, the main program calls OUTPUT a final time to cause it to flush any partially filled buffer. The subroutine OUTPUT in turn calls upon two bit manipulation routines, called JGETB and JPUTB, contained in Listing 3.

For ease of presentation, the program in Listing 1 is constrained to handle image lines of length 10, only 5 connect codes, 10 head codes, and 8 region identification codes. The restriction on 5 connect codes is obtained by limiting connecting veins to be within 2 pels of each other. Tests to invoke this restriction are added at blocks 7545 and 7560. In order to test for this properly, the progression to the next AA run indicated at block 7550 in FIG. 4B is done instead at 7545. This then requires that AA be retrogressed 2 runs at block 7580.

The codewords and codeword lengths in bits are contained in the codebooks specified in the DATA statements at the beginning of the program. The arrays KODEC and KBITC contain the codewords, and the codeword lengths in bits, respectively, for the 5 connect codes. The arrays KODEH and KBITH contain this information for the head codes. The arrays KODEI and KBITI contain this information for the region ID codes. The variables KODEE and KBITE contain this information for the single end code. The codewords are in octal form, and the codeword lengths are in decimal form. For example, the code for a head of length 1 pel is contained in the first member of the array KODEH. This has the value of octal$\phi\phi\phi\phi\phi\phi\phi\phi$74. The corresponding first member of KBITH is 6, which tells us that the codeword is 6 bits long. The codeword then is octal 74, or binary 111100. For a connect where the LINEB run is two to the left of the LINEA run, the index into the codebook is computed to be KB−KA+−MAXDIF+1, where MAXDIF is the maximum allowable distance in pels between the two runs. In this case, then the index is 1. Entering the array KODEC with index 1 yields the value of octal$\phi\phi\phi\phi\phi\phi\phi\phi\phi\phi$. The corresponding first member of KBITC is 1, indicating that the codeword is 1 bit long. The codeword then is simply 0.

The set of codewords in Listing 1 are Huffman minimum-redundancy codewords. Any other set of variable or fixed length codewords apply equally well. In addition, although the number of codewords and the image line length are restricted in the sample program, the present invention bears no such limitation. It is apparent to any one skilled in the art that the image line length and the codebooks may be increased to any amount within the storage capacity of the processor by changing the array dimensions in the DIMENSION statement, and the declared line length L, and the codebook definition in the DATA statements.

Decoding of the encoded data and regeneration of the levels corresponding to the original digitized form of the image proceeds as a reverse process to the encoding process described above. In particular where variable length codes are used, the passing and decoding of a bit stream consisting of such codes may be accomplished by the decoding system disclosed in my afore-

APPENDICES

LISTING 1

```
C   MULTILEVEL PROCESSING PROGRAM
C
      DIMENSION LINEA(12),LINEB(12),KODEC(5),KODEH(10),
     1          KODEI(8),KBITC(5),KBITH(10),KBITI(8)
C
C   CODEBOOKS:
C
      DATA KODEC/O000000000000,O000000000014,O000000000015,
     1           O000000000034,O000000000035/,
     2     KBITC/1,4,4,5,5/
      DATA KODEH/O000000000074,O000000000172,O000000000173,
     1           O000000000174,O000000000175,O000000000176,
     2           O000000000774,O000000000775,O000000000776,
     3           O000000000777/,
     4     KBITH/6,7,7,7,7,7,9,9,9,9/
      DATA KODEI/O000000000000,O000000000002,O000000000006,
     1           O000000000024,O000000000025,O000000000026,
     2           O000000000076,O000000000077/,
     3     KBITI/1,2,3,5,5,5,6,6/
      DATA KODEE/O000000000002/, KBITE/2/
      DATA L/10/,LINE/0/
C
C   INITIALIZE:
C
      L1=L+1
      L2=L+2
      MAXDIF=2
C
C   READ NEXT IMAGE LINE; INSERT TRANSITION PELS AT START
C   AND END OFF LINE; IF FIRSTT LINE, CODE ALL RUNS AS HEADS:
   10 READ (09,END=9999)(LINEB(I),I=2,L1)
      LINEB(1)=LINEB(2)+1
```

```
        LINEB(L2)=LINEB(L1)+1
        IF(LINE-GT.0) GO TO 7500
        LINE=1
C
C   PROCESS FIRST IMAGE LINE:
C
C       KA=L+1
        KB=0
        GO TO 7510
C
C   PROCESS LINES A AND B:
C
  7501 KA=0
       KB=0
  7505 KA=KA+1
       IF(LINEA(KA).EQ.LINEA(KA+1)) GO TO 7505
  7510 KBR=KB
  7511 KB=KB+1
       IF(LINEB(KB).EQ.LINE(KB+1)) GO TO 7511
  7515 IF(KA.EQ.L) GO TO 7530
       IF(KA.LT.L) GO TO 7535
  7520 LEN=KB-KBR
       CALL OUTPUT(KBITH(LEN),KODEH(LEN))
       LEV=LINEB(KB)+1
       CALL OUTPUT(KBITI(LEV),KODEI(LEV))
  7525 IF(KB.LT.L) GO TO 7510
       GO TO 7599
  7530 IF(LINEA(KA.NE.LINEB(KB)) GO TO 7520
       GO TO 7540
  7535 IF(LINEA(KA.NE.LINEB(KB)) GO TO 7545
  7540 NDEX=KB-KA+MAXIF+1
       CALL OUTPUT(KBITC(NDEX),KODEX(NDEX))
       GO TO 7585
  7545 KA=KA+1
       IF(LINEA(KA).EQ.LINEA(KA+1)) GO TO 7545
       IF(LINEA(KA).NE.LINEB(KB)) GO TO 7555
```

```
      IF(IABS(KA,KB).GT.2) GO TO 7555

7550  CALL OUTPUT(KBITE,KODEE)

NDEX=KB-KA+MAXDIF+1

CALL OUTPUT(KBITC(NDEX),KODEC(NDEX))

GO TO 7585

7555  KA=KA+1
      IF(LINEA(KA).EQ.LINEA(KA+1)) GO TO 7555
7556  IF(KA.GT.L) GO TO 7570

7560  IF(LINEA(KA).NE.LINEB(KB)) GO TO 7570

IF(IABS(KA,KB).GT.2) GO TO 7570

7565  CALL OUTPUT(KBITE,KODEE)

GO TO 7550
7570  LEN=KB-KBR

CALL OUTPUT(KBITH(LEN),KODEH(LEN))

LEV=LINEB(KB)+1

CALL OUTPUT(KBITI(LEV),KODEI(LEV))

7575  IF(KB.EQ.L) GO TO 7599

7580  DO 7582 M=1,2

7581  KA=KA-1

7582  IF(LINEA(KA).EQ.LINEA(KA+1)) GO TO 7581

GO TO 7510

7585  IF(KB.EQ.L) GO TO 7599

7590  IF(KA.LT.L) GO TO 7505

7595  KA=KA+1

GO TO 7510
C
C   START OF NEW LINE, MOVE LINE B TO LINE A:
C
7599  DO 7600 N=1,L2

7600  LINEA(N)=LINEB(N)

GO TO 10
C
C   FINAL CALL TO SUBROUTINE OUTPUT TO FLUSH BUFFER:
C
9999  CALL OUTPUT(37,0)

STOP

END
```

LISTING 2

```
C       OUTPUT SUBROUTINE
C
        SUBROUTINE OUTPUT(N,JWORD)
C
C   THIS SUBROUTINE MOVES THE N RIGHTMOST BITS OF THE WORD JWORD TO THE
C   BUFFER IBUF.  EACH TIME IBUF IS FILLED IT IS OUTPUTTED.  N>36 CAUSES
C   THE UNFILLED PORTION OF IBUF TO BE FILLED WITH ZEROES AND OUTPUTTED.
C
        DIMENSION IBUF(100)
        DATA I/1/,IBUFSZ/100/,IZERO/0/,NBITS/36/
        DATA NBUF/0/
C
C   NBITS IS MACHINE WORD SIZE
C
C   TEST FOR FINAL CALL:
C
        IF(N.GE.37) GO TO 20
        N2=N
C
C   TEST IF INPUT BITS EXCEED BUFFER
C
        ITBITS=NBITS*IBUFSZ+1
        NLEFT=ITBITS-I
        JWORD2=JWORD
        IF(N.LE.NLEFT) GO TO 10
C
C   INPUT BITS EXCEED BUFFER.  BREAK BITS INTO TWO PARTS.
C   EXTRACT INITIAL NUMBER OF BITS AND PUT AT END OF CURRENT BUFFER LOAD
C
        N2=NLEFT
        K=NBITS+1-N
        JWORD2=JGETB(JWORD,K,NLEFT)
     10 CALL JPUTB(IBUF,I,N2,JWORD2)
        I=I+N2
        IF(I.LT.ITBITS) RETURN
C
C   WRITE OUT FULL BUFFER
C
        WRITE (09) IBUF
        NBUF=NBUF+1
        I=1
        IF(N.EQ.N2) RETURN
C
C   PUT FINAL NUMBER OF BITS AT START OF NEXT BUFFER LOAD
C
        N2=N-NLEFT
        CALL JPUTB(IBUF,I,N2,JWORD)
        I=I+N2
        RETURN
C
C   THIS IS FINAL CALL; FLUSH BUFFER, IF NECESSARY.
C
     20 IF(I.EQ.1) GO TO 50
C
C   FILL CURRENT WORD WITH ZEROES
C
        L=(I-1)/NBITS+1
        M=L*NBITS-I+1
        CALL JPUTB(IBUF,I,M,IZERO)
        IF(L.EQ.IBUFSZ) GO TO 40
C
C   FILL REST OF BUFFER WITH ZEROES
C
        L=L+1
```

```
      DO 30 J=L,IBUFSZ
   30 IBUF(J)=0
C
C  WRITE OUT BUFFER AND END OF FILE MARK
C
   40 WRITE (09) IBUF
      NBUF=NBUF+1
   50 END FILE 09
      RETURN
      END
```

LISTING 3

This is a listing of the FORTRAN routines JGETB and JPUTB which use only the functions MOVEL (shift left), MOVER (shift right logical), and OR.

```
C    JGETB  RETRIEVES SPECIFIED BITS
         FUNCTION JGETB(STRING,I,N)
C    ROUTINE USES MOVER AND MOVEL FUNCTIONS WHICH SHIFT THE
C    BITS IN A WORD RIGHT AND LEFT.
C    STRING IS BIT STRING.
C    I IS STARTING BIT OF DESIRED STRING.
C    N IS LENGTH OF DESIRED BIT STRING.
C
         INTEGER STRING(1),Q,R,W,WORK,OR
C    HONEYWELL 6000 HAS 36 BITS/WORD
         DATA W/36/
         Q = (I-1)/W
         R = MOD((I-1),W)
         IWORD = Q+1
         IF (R+N.GT.W)  GO TO 10
C    ALL BITS IN SAME WORD
         WORK = MOVEL(STRING(IWORD),R)
         JGETB = MOVER(WORK,W-N)
         RETURN
C    BITS SPAN A WORD BOUNDARY
   10    N1 = W-R
         N2 = N-N1
         WORK = MOVEL(STRING(IWORD),R)
         JGETB = MOVER(WORK,W-N)
         IWORD = IWORD+1
         WORK = MOVER(STRING(IWORD),W-N2)
         JGETB = OR(JGETB,WORK)
         RETURN
         END

C    JPUTB  REPLACES BITS IN STRING
         SUBROUTINE JPUTB(STRING,I,N,PUT)
C    ROUTINE USES MOVER AND MOVEL FUNCTIONS WHICH SHIFT THE
C    BITS IN A WORD RIGHT AND LEFT.
C    STRING IS BIT STRING.
C    I IS STARTING BIT OF STRING TO REPLACE.
C    N IS LENGTH OF STRING TO REPLACE.
C    RIGHTMOST N BITS OF PUT ARE USED AS REPLACEMENT.
C
         INTEGER STRING(1),PUT,Q,R,PUT2,WORK,OR,TAIL,W
C    HONEYWELL 6000 HAS 36 BITS/WORD
         DATA W/36/
         Q = (I-1)/W
         R = MOD((I-1),W)
         IWORD = Q+1
```

```
        IF (N+R.GT.W)   GO TO 10
C    ALL BITS IN SAME WORD
C    CLEAR UPPER BITS OF PUT
        PUT2 = MOVEL(PUT,W-N)
        PUT2 = MOVER(PUT2,W-N)
C    GET TRAILING BITS IN WORD, SAVE
        TAIL = MOVEL(STRING(IWORD),R+N)
        TAIL = MOVER(TAIL,R+N)
        WORK = MOVER(STRING(IWORD),W-R)
        WORK = MOVEL(WORK,N)
        WORK = OR(WORK,PUT2)
        WORK = MOVEL(WORK,W-N-R)
        STRING(IWORD) = OR(WORK,TAIL)
        RETURN
C    BITS SPLIT BY WORD BOUNDARY
     10 N1 = W-R
        N2 = N-N1
C    WORK WITH FIRST WORD
        PUT2 = MOVEL(PUT,W-N)
        PUT2 = MOVER(PUT2,W-N1)
        WORK = MOVER(STRING(IWORD),N1)
        WORK = MOVEL(WORK,N1)
        STRING(IWORD) = OR(WORK,PUT2)
C    NOW NEXT WORD
        IWORD = IWORD+1
        PUT2 = MOVEL(PUT,W-N2)
        WORK = MOVEL(STRING(IWORD),N2)
        WORK = MOVER(WORK,N2)
        STRING(IWORD) = OR(WORK,PUT2)
        RETURN
        END
```

What is claimed is:

1. Apparatus for coding a two-dimensional information field having a plurality of regions, each region having one of a plurality of different graphical values, comprising scanning means for generating for each scanned region a first binary electric code representative of the length of a constant-value run along a scanning path spanning said field, means for generating for each region a second binary electric code representative of the graphical value of said region, means for generating for any other scanning path spanning said field and passing through said region a third binary electric code representative of the connectivity of a constant-value run along said other scanning paths to a constant-value run along an adjacent scanning path, and means for generating for each region a fourth binary electric code representative of the end of the last scanning path spanning said region.

2. The apparatus of claim 1, wherein said scanning paths spanning said field are parallel scan lines, and wherein said means for generating said first, second, third and fourth binary electric codes for each region comprises means for sequentially examining said binary electric code representations of said scan lines starting with a binary electric code representation of a reference scan line.

3. The apparatus of claim 2 wherein said means for examining comprises means for storing binary electric signals representative of said graphical values for successive points along n adjacent scan lines.

4. Apparatus according to claim 3 wherein n=2.

5. Apparatus according to claim 4 wherein said means for examining includes shift register means for comparing the binary bit positions of said binary electric coded representations of like-valued runs on two successive scan lines.

6. Apparatus according to claim 3 further comprising means for defining new regions which are fragments of other regions, and means for encoding said new regions in the same manner as other regions.

7. A machine method for coding a two-dimensional information field having a plurality of regions, each region having one of a plurality of different graphical values, comprising the steps of scanning said two-dimensional information field in successive lines to generate electrical signals representing said plurality of graphical values, generating for each region a first binary electric code representative of the length of a constant-value run along a scanning path spanning said field, generating for each region a second binary electric code representative of the graphical value of said region, generating for any other scanning path spanning said field and passing through said region a third binary electric code representative of the connectivity of a run along said other scanning paths to a run along an adjacent scanning path, and generating a fourth binary electric code for each region representative of the end of the last scanning path spanning said region.

8. The method of claim 7 wherein said paths scanning spanning said field are parallel scan lines, and wherein said steps of claim 7 comprise comparing the positions in each said scan line of like-valued runs for each of a plurality of successive scan lines and generating said first, second, third and fourth codes in response to said comparing.

* * * * *